US008527146B1

(12) United States Patent
Jackson et al.

(10) Patent No.: US 8,527,146 B1
(45) Date of Patent: Sep. 3, 2013

(54) SYSTEMS AND METHODS FOR UPDATING VEHICLE BEHAVIOR AND SETTINGS BASED ON THE LOCATIONS OF VEHICLE PASSENGERS

(75) Inventors: Dean Kenneth Jackson, Pittsburgh, PA (US); Daniel Victor Klein, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/361,053

(22) Filed: Jan. 30, 2012

(51) Int. Cl.
*G06F 7/00* (2006.01)
*B60R 25/00* (2013.01)
*B60K 28/00* (2006.01)
*H04N 7/18* (2006.01)

(52) U.S. Cl.
USPC ............... 701/36; 180/287; 180/273; 348/77; 348/155

(58) Field of Classification Search
USPC .................. 701/36, 45, 46, 49, 28; 180/272, 180/287, 273; 280/734, 735, 100, 104, 156, 280/190, 173, 175, 180, 209, 224, 103, 107, 280/203, 123, 199; 356/4.07, 5.05, 3.01, 356/138, 614, 622; 348/77, 155; 340/438; 359/843, 872, 839, 855; 33/228, 264, 278, 33/279; 73/1.75, 1.79; 382/100, 104, 156, 382/190, 173, 175, 180, 209, 224, 103, 107, 382/203, 123, 199
See application file for complete search history.

(56) References Cited

U.S. PATENT DOCUMENTS

| 5,993,015 | A | 11/1999 | Fredricks |
| 6,501,536 | B1 | 12/2002 | Fredricks |
| 2010/0152977 | A1 | 6/2010 | Jungert et al. |
| 2011/0137520 | A1* | 6/2011 | Rector et al. .................... 701/36 |

OTHER PUBLICATIONS

Welsh, "Hyundai Connectivity Concept Ditches Car Keys in Favor of your NFC-Equipped Smartphone", The Verge, Dec. 27, 2012, printed from the internet Mar. 1, 2013<http://www.theverge.com/2012/12/27/3807742/hyundai-connectivity-concept-trades-car-keys-for-nfc-coming-2015>.

* cited by examiner

*Primary Examiner* — Muhammad Shafi
(74) *Attorney, Agent, or Firm* — Fox Rothschild LLP

(57) ABSTRACT

A system and method for controlling one or more settings of a vehicle using a device comprising an electronic circuit is disclosed. The electronic circuit is configured to obtain a position of a passenger within the vehicle, identify said passenger, obtain information comprising one or more setting preferences for said passenger use the position and at least one of the information to determine whether one or more settings need to be changed, and change the one or more settings based on the position and identity of the passenger. The electronic circuit is also configured to identifying a driver, compare the identity of the driver with a predetermined list of drivers of the vehicle, and change a plurality of operational parameters based on the identity of the driver.

11 Claims, 6 Drawing Sheets

SYSTEMS AND METHODS FOR UPDATING VEHICLE BEHAVIOR AND SETTINGS BASED ON THE LOCATIONS OF VEHICLE PASSENGERS

BACKGROUND

1. Statement of the Technical Field

Embodiments include computing systems and methods for updating vehicle behavior and settings based on the locations of passengers within the vehicle.

2. Description of the Related Art

The uses and applications of computers in vehicles such as automobiles are growing as manufacturers are increasingly including sophisticated vehicle computing systems capable of controlling operational vehicle components, such as environmental control systems, audio and video systems, cruise control and engine power systems, keyless entry and operation systems, heads-up displays, power locks, and seat and steering adjustments. As mobile communications technology has become more widespread, automotive computing systems are available that also include network based applications including navigation, voice search, media streaming capabilities, and the like.

Systems have been introduced to allow for automatic changes in preference settings based on which key is used to operate a vehicle. For example, when the key associated with driver A is inserted, the previous settings for the driver's seat position used by driver A may be imposed. These systems are limited, however, because they only control preferences such as the seat position of the driver seat and generally do not include settings for the passengers in other seats or for other systems subject to preferential control.

Mobile communications devices, such as a mobile phone, a smart phone, a laptop computer, a Personal Digital Assistant ("PDA"), are common in the market place. Smart phones, in particular, have become increasingly powerful both in processing power and in the breadth of utility. Programmed applications have been introduced that expand the functionality of the smart phone. Both mobile communications devices and automotive computing systems increasingly include geographic location or position detection systems, such as a Global Positioning System ("GPS"). The term GPS includes Differential GPS ("DGPS"). In phone and automotive computing applications, the GPS device is often used to provide position information in applications that provide services to a user thereof. Such services can include, but are not limited to, navigation services, location services, position reporting services, traffic status services, tour information services and commerce services.

Mobile communications devices are also often equipped to communicate with other nearby devices, such as by using near field communication (NFC). Thus, by various means, it would be desirable for driver and/or passenger mobile communications devices to communicate with a vehicle computing system, for the vehicle computing system to ascertain which seats are occupied by the driver and/or passengers, and to further control various operational components of the vehicle based on driver/passenger seating. There is a need for systems and methods for updating vehicle behavior and settings in such a manner.

SUMMARY

A system and method for controlling one or more settings of a vehicle using a device comprising an electronic circuit is disclosed. The electronic circuit is configured to obtain a position and identity of the driver and passenger(s) within the vehicle, obtain information such as one or more setting preferences for the driver/passenger(s), use the information to determine whether one or more settings need to be changed, and change those settings. The settings may include seat position, mirror position, as well as aspects of the audio system, video system, media libraries, environmental control system, heating and cooling system including vent direction, navigation system, and engine. It is also envisioned that preference settings changed by the driver/passenger(s) may then be saved for future access.

The electronic circuit is also configured to identify the driver, compare the identity of the driver with a predetermined list of drivers of the vehicle, and change various operational parameters based on the identity of the driver and/or an operational profile for the driver. The predetermined list of drivers of the vehicle may also define the driver as an owner, authorized driver, unauthorized driver, restricted driver, unrestricted driver, or the like. The operational parameters may include any of vehicle speed, vehicle occupancy, allowed driving hours, allowed driving area, seatbelt use, or the like.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
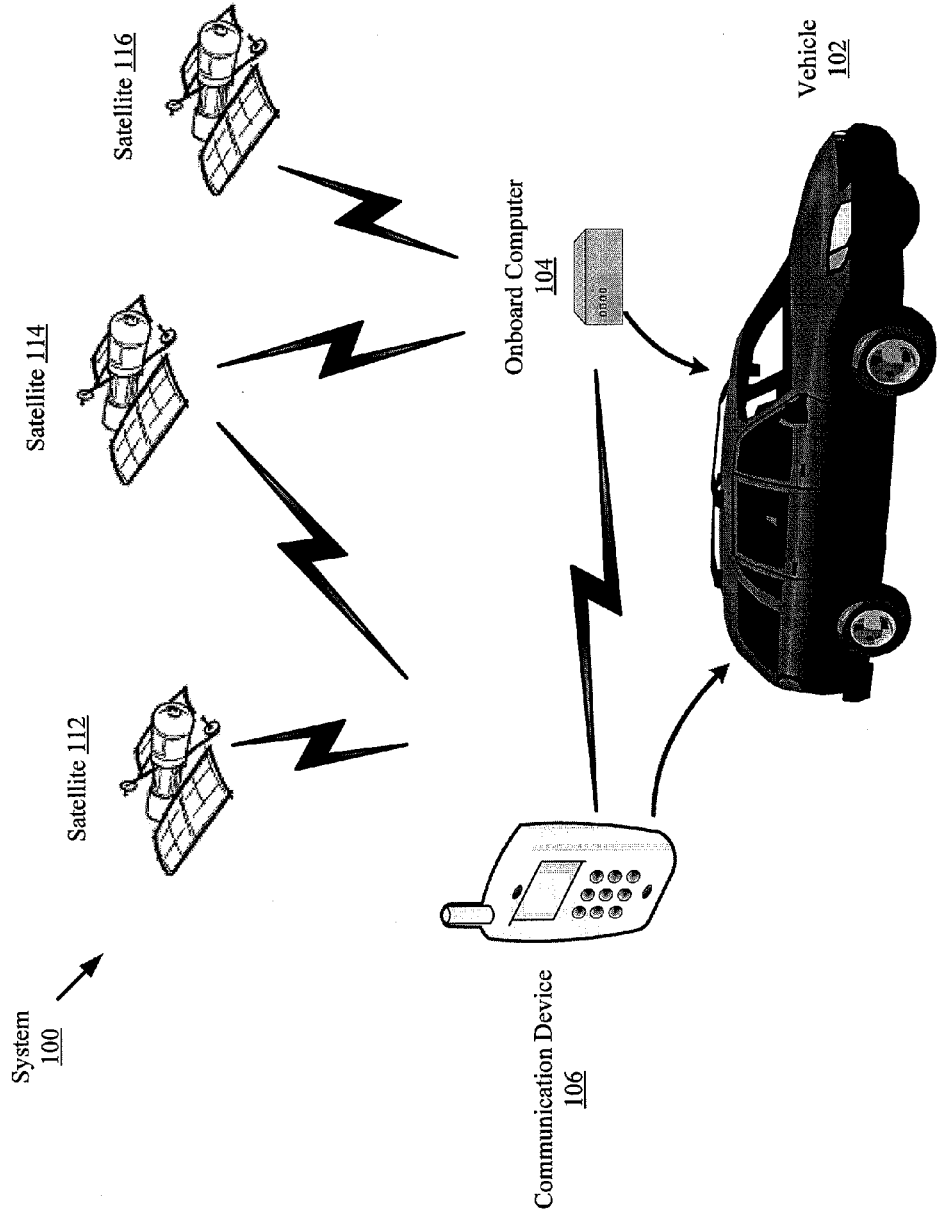
FIG. 1 is a block diagram of an exemplary automotive system.

Example implementations of the present invention are described with reference to the attached figures. The figures are not drawn to scale and they are provided merely to illustrate the instant invention. Several aspects are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or"

rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Embodiments include systems and methods for controlling passenger and driver preferences for automatically adjustable settings by an on-board computer in a vehicle based on a location and/or identity of a person in a vehicle. For example, in an implementation, the onboard computer is able to determine the positions of all persons within a vehicle, and store, maintain, and update configurable settings that control various aspects of the vehicle for each passenger, not merely for the driver. These aspects may include, but are not limited to, seat position settings, mirror position settings, audio system settings, video system settings, media libraries; environmental control system settings, heating and cooling system settings, vent direction settings, navigation system settings, and engine settings.

Embodiments can provide various functions which are not provided by conventional automatic adjustment systems. These functions may include, but are not limited to, engine tuning adjustments, navigation system presets, audio/video presets, available media libraries, and the like. Implementations are also capable of enabling, disabling, and/or restricting operational functions of the vehicle based on the identity and/or age of the driver. Restrictions may include, but are not limited to, limiting driving speed—e.g. limit to 30 miles per hour in city driving and 55 miles per hour on the highway, limiting driving hours, limiting driving area, limiting the number of occupants, and disabling the vehicle until seat belts are secured, and the like. Exemplary implementations also allow for registration of drivers into categories including, but not limited to, owners, authorized drivers, restricted and unrestricted drivers, and forbidden or unauthorized drivers.

Method implementations generally involve determining the position of each passenger in a vehicle and obtaining information comprising one or more setting preferences for each passenger. For example, this information may be obtained by an on board computer or from the passenger's electronic device (e.g. smart phone or tablet computer). Location and/or identity and the information comprising one or more setting preferences may then be used to determine whether one or more settings need to be changed or updated. If it is determined that the one or more settings need to be changed or updated, then the settings may be so changed or updated.

Various implementations may use alternative devices and device applications. Such applications include, but are not limited to, mobile phone applications, portable computer applications, PDA applications, portable navigation device applications, as well as any other application in which vehicle setting preferences may be automatically controlled based on a position and/or identity of a person within the vehicle. Various alternative methods may be employed to determine the identity of the passenger and the collocation of the passenger with the vehicle 102, such as but not limited to use of a scanning a passenger's fingerprint, scanning a bar-code, use of an RFID keyfob, or the passenger may enter a password on a keypad, or the like. Exemplary implementing system embodiments of the present invention will be described below in relation to FIGS. 1-3. Exemplary method embodiments of the present invention will be described below in relation to FIGS. 4-5B.

Exemplary Systems

Referring now to FIG. 1, there is provided a block diagram of an exemplary system 100 that is useful for understanding the present invention. An exemplary system 100 comprises communication device 106, satellites 112-116, an onboard computer 104, and a vehicle 102. The system 100 may include more, less or different components than those illustrated in FIG. 1. However, the components shown are sufficient to disclose an illustrative embodiment implementing the present invention.

The vehicle 102 is also configured to allow the onboard computer 104 to control automatically configurable settings within the vehicle 102 based on a position and/or an identity of a passenger within the vehicle. Each passenger who enters the car may have a set of preferences for each of the automatically configurable settings. By default, the settings may be the most recently used settings for that passenger. Whether the settings need to be changed is determined by the onboard computer 104 based at least on the position data and/or sensor data obtained by the vehicle's onboard computer. Position data may include vehicle GPS position as described above as well as position information from driver and/or passenger communication devices. The sensor data may include, but is not limited to, weight sensor data, and photographic image data.

Methods for determining updated location estimates for vehicle 102 and communication device 106 based on GPS data are well known in the art, and therefore will not be described in detail herein. Any such known method for determining updated location estimates can be used with the present invention without limitation. As an individual carrying communication device 106 approaches the car, the location of the vehicle 102 and the location of the communication device 106 are obtained. The two locations for vehicle 102 and communication device 106 are compared and it is determined if the communication device is located within the vehicle 102. This determination may be performed in any of several ways. For example, if the vehicle 102 and communication device 106 are moving together in the same direction and at the same speed within a certain predetermined distance of each other, it may be determined that the passenger holding the communication device 106 is in the vehicle. This determination may be performed by electronic circuitry within the onboard computer 104 in the vehicle 102 or, alternatively, the communication device 106. In an implementation, this determination may also be made by a server (not depicted in FIG. 1).

Further, the vehicle's onboard computer 104 and the communication device 106 may be coupled via a wired connection, e.g. a universal serial bus (USB) or IEEE 1394 connection, or a wireless connection, e.g. a Wifi, Bluetooth, RFID, and/or near field communication (NFC) connection. This coupling may be used by the onboard computer 104, by itself or together with additional information, to infer that the communication device 106 is located within the vehicle 102

Figure 2:
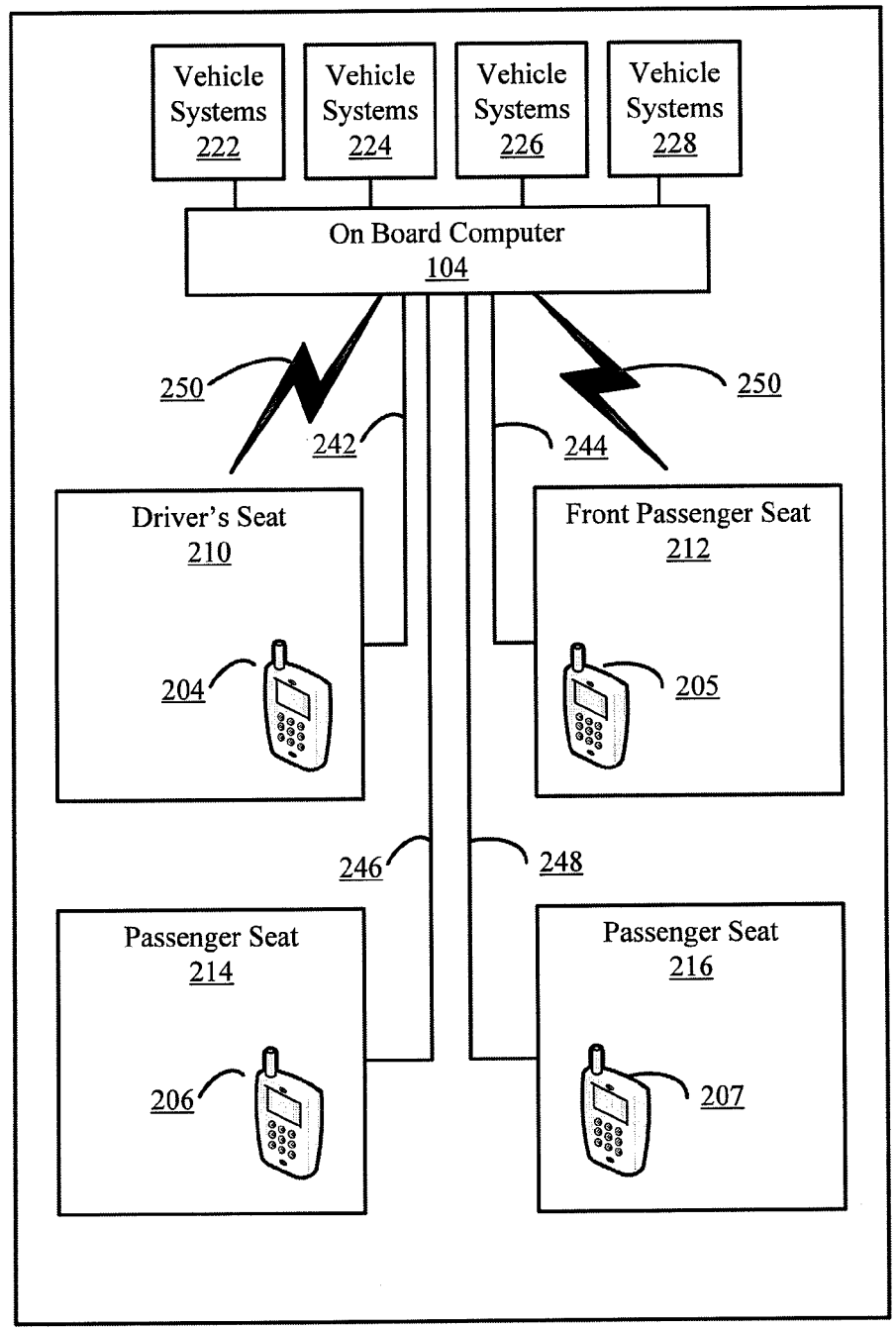
FIG. 2 is a block diagram of an exemplary automotive system.

Referring now to FIG. 2, there is provided a more detailed block diagram of the vehicle 102. The vehicle 102 will be described herein as including an onboard computer 104.

Notably, the vehicle 102 can include more or less components than those shown in FIG. 2. For example, the vehicle 102 can include a wired system interface, such as a USB interface (not depicted) to connect the onboard computer 104 with vehicle systems 222-228 and seat locations 210-216. However, the components shown are sufficient to disclose an illustrative embodiment implementing the present invention. The hardware architecture of FIG. 2 represents one embodiment of a representative vehicle configured to facilitate the control of automatically configurable settings of vehicle 102. In this regard, the vehicle of FIG. 2 implements a method for automatically controlling vehicle settings based on various types of information, such as position information and identity information. Exemplary embodiments of said method will be described below in relation to FIGS. 5-6.

As shown in FIG. 2, the vehicle 102 includes onboard computer 104, which controls various systems within vehicle 102. Vehicle 102 also comprises passenger seat position 210-216, a driver's seat position 210, a front passenger seat position 212, and left and right rear passenger seat positions 214 and 216. Although four seat positions are shown in FIG. 2 for illustrative purposes, the present invention is not so limited and may accommodate any number of seats in any arrangement within the vehicle. In one implementation, each passenger seat position has automatically adjustable settings for seat comfort, including but not limited to, seat height adjustment, fore and aft adjustment position, seatback angle adjustment. Each passenger seat position may also include separately configurable environmental controls for heating, cooling, vent direction, and audio/video consoles as appropriate. Also shown in FIG. 2 are communication devices 204-207, one for each passenger position, indicating that each passenger in vehicle 102 is carrying a communication device such as communication device 106, described above. Although the exemplary embodiment illustrated in FIG. 2 shows each passenger carrying a communication device, various implementations envision that not all passengers need to carry a device. Indeed it is not required that any communication devices be present in the vehicle at all. The onboard computer 104 may be connected to the seat positions 210-216 via wired connections 242-248. Alternatively, onboard computer 104 may be connected to seat locations 210-216 through a wireless interface via wireless connection 250. Wireless connection 250 may be any wireless connection, including but not limited to, Wifi (IEEE 802.11x) and/or Bluetooth.

Onboard computer 104 is also preferably controllably connected to vehicle systems 222-224. These systems may include, but are not limited to, engine tuning systems, engine limiting systems, GPS/navigation systems, and the like. Vehicle systems 222-228 may be connected through a wired connection, as shown in FIG. 2, or by other means.

Figure 3:
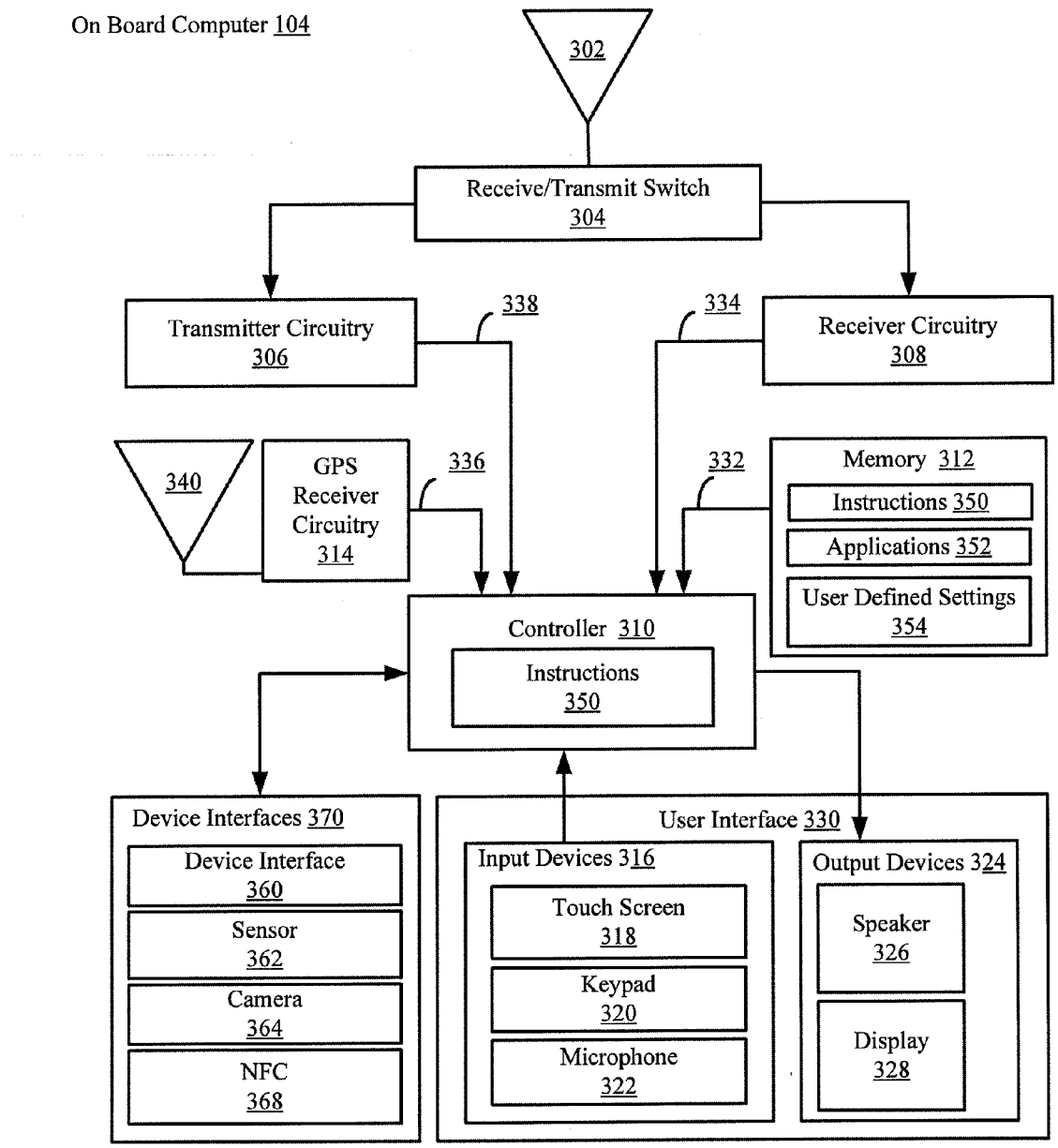
FIG. 3 is a block diagram of an exemplary automotive device.

Referring now to FIG. 3, there is a more detailed block diagram of the onboard computer. The onboard computer 104 will be described herein as comprising an in-dash computer. However, the disclosed embodiments are not limited in this regard. For example, the onboard computer 104 can alternatively comprise a notebook, a laptop computer, a PDA, a tablet computer, a portable navigation device, or other device, and may be located anywhere within vehicle 102.

Notably, the onboard computer 104 can include more or less components than those shown in FIG. 3. For example, the onboard computer 104 can include a wired system interface, such as a universal serial bus interface (not depicted). However, the components shown are sufficient to disclose an illustrative embodiment implementing the present invention. The hardware architecture of FIG. 3 represents one embodiment of a representative communication device configured to facilitate the control of automatically configurable settings of vehicle 102. In this regard, the onboard computer of FIG. 3 implements a method for automatically controlling vehicle settings based on various types of information, such as position information and identity information. Exemplary embodiments of said method will be described below in relation to FIGS. 5-6.

As shown in FIG. 3, a receive/transmit (Rx/Tx) switch 304 selectively couples the antenna 302 to the transmitter circuitry 306 and receiver circuitry 308 in a manner familiar to those skilled in the art. The receiver circuitry 308 demodulates and decodes the RF signals received from any components connected to the onboard computer 104 through a wireless connection (e.g. wireless connection 250 of FIG. 2). The receiver circuitry 308 is coupled to a controller 310 via an electrical connection 334. The receiver circuitry 308 provides the decoded RF signal information to the controller 310. The controller 310 uses the decoded RF signal information in accordance with the function(s) of the onboard computer 104. For example, if the RF signals include identifier information and/or location information for other communication devices (e.g., devices 204-207 of FIG. 2), then the identifier and/or location information can be used by the controller 310 to identify other devices that are pre-defined distances from or within range of the onboard computer 104. The controller 310 also provides information to the transmitter circuitry 306 for encoding and modulating information into RF signals. Accordingly, the controller 310 is coupled to the transmitter circuitry 306 via an electrical connection 338. The transmitter circuitry 306 may communicate the RF signals to the antenna 302 for transmission to an external device (e.g., devices 204-207 of FIG. 2). In an implementation, the transmitter circuitry 306 and receiver circuitry 308 may communicate through a mobile network to a server (non depicted in FIG. 3).

In an implementation, the vehicle 102 is a GPS enabled vehicle. As such, the vehicle 102 includes a GPS receiver (not shown in FIG. 1) in communication with an onboard computer 104. The GPS receiver is generally configured to receive GPS signals from the satellites 112-116 and process the GPS signals to determine an estimate of the current location of the vehicle 102 on Earth. The current location of the vehicle 102 is determined by computing a difference between a time that each GPS signal is sent by a respective satellite 112-116 and a time that the GPS signal was received by the GPS receiver of the vehicle 102. The time difference is then used by the vehicle 102 to compute a distance, or range, from its GPS receiver to the respective satellite 112-116. Thereafter, the vehicle 102 computes its own two-dimensional or three-dimensional position using the computed ranges to the satellites 112-116 and a location of the satellites 112-116 when the GPS signals were sent therefrom. The multi-dimensional position is defined by GPS data specifying a direction, a latitude, a longitude, an altitude and/or a velocity.

An antenna 340 is coupled to GPS receiver circuitry 314 for receiving GPS signals. The GPS receiver circuitry 314 demodulates and decodes the GPS signals to extract GPS location information therefrom. The GPS location information indicates the location of the vehicle 102. The GPS receiver circuitry 314 provides the decoded GPS location information to the controller 310. As Such the GPS receiver circuitry 314 is coupled to the controller 310 via an electrical connection 336. Notably, the present invention is not limited to GPS based methods for determining a location of the vehicle 102. Other methods for determining a location of a communication device may be used with the present invention without limitation.

The controller 310 uses the decoded GPS location information in accordance with the function(s) of the onboard computer 104. For example, the GPS location information and/or other location information can be used to generate a geographic map showing the location of the vehicle 102. The GPS location information and/or other location information can also be used to determine the actual or approximate distance between the vehicle 102 and other communication devices (e.g., communication device 106 of FIG. 1). The GPS location information and/or other location information can further be used to determine whether one or more of vehicle systems 222-224, shown in FIG. 2, need to be enabled or disabled.

The controller 310 stores the decoded RF signal information and the decoded GPS location information in a memory 312 of the onboard computer 104. Accordingly, the memory 312 is connected to and accessible by the controller 310 through an electrical connection 332. The memory 312 can be a volatile memory and/or a non-volatile memory. For example, the memory 312 can include, but is not limited to, a Random Access Memory (RAM), a Dynamic Random Access Memory (DRAM), a Static Random Access Memory (SRAM), Read-Only Memory (ROM) and flash memory. The memory 312 can also have stored therein the software applications 352 and user-defined settings 354.

The software applications 352 include, but are not limited to, applications operative to determine the positions of other devices and passengers within the vehicle 102 and/or determine the location of the vehicle 102 relative to the other devices. At least one of the software applications 352 is operative to: control functions of other software applications based on various types of information (such as position information and activity information); and/or facilitate an establishment of the user-defined settings 354 by a passenger of the vehicle 102, for example, the driver or owner of the vehicle 102.

The user-defined settings 354 comprise statements that define or constrain some operations of the vehicle 102 and/or the onboard computer 104. More specifically, at least one of the user-defined settings 354 includes one or more setting preferences that define the configuration of various automatically configurable settings throughout the vehicle 102. For example, a user-defined setting 354 includes a seat position setting preference when the owner of vehicle 102 is seated in the driver's seat. The onboard computer 104 recognizes the individual seated in the driver seat, retrieves the seat position setting preference from the user defined settings 354, and instructs the power seat to adjust each automatically configurable parameters to conform with the seat position setting preference.

In one implementation, a user-defined rule 254 includes a restricted user operational restriction when a teenage child of the owner is in the driver's seat. The onboard computer 104 recognizes the individual seated in the driver seat, retrieves the restricted user operational restriction from the user defined settings 354, and limits one or more of the vehicle systems to conform to the restricted user operational restriction. One skilled in the art will recognize that many combinations of environmental preferences and operational restrictions may be combined. For example, when the individual in the driver's seat is recognized by the on-board computer as the owner's teenage child, both the seat position setting preference and the restricted user setting preference may retrieved and imposed. Embodiments of the present invention are not limited in this regard.

As shown in FIG. 3, one or more sets of instructions 350 are stored in the memory 312. The instructions 350 can also reside, completely or at least partially, within the controller 310 during execution thereof by the onboard computer 104. In this regard, the memory 312 and the controller 310 can constitute machine-readable media. The term "machine-readable media", as used here, refers to a single medium or multiple media that store the one or more sets of instructions 350. The term "machine-readable media", as used here, also refers to any medium that is capable of storing, encoding or carrying the set of instructions 350 for execution by the onboard computer 104 and that cause the onboard computer 104 to perform one or more of the methodologies of the present disclosure.

The controller 310 is also connected to a user interface 330. The user interface 330 is comprised of input devices 316, output devices 324, and software routines (not shown in FIG. 2) configured to allow a user to interact with and control software applications 352 installed on the onboard computer 104. Such input and output devices respectively include, but are not limited to, a display 328, a speaker 326, a keypad 320, a directional pad (not shown in FIG. 2), a directional knob (not shown in FIG. 3), a microphone 322, a touch screen 318, and the like. In one implementation, the keypad 320, touch screen 318, or similar device may be employed to directly input which seats are occupied by which drivers.

The microphone 322 facilitates the capturing of sound (e.g. voice commands) and converting the captured sound into electrical signals. The electrical signals may be used by the onboard computer 104 interface with various applications 352. In one implementation, voice commands may be employed, through microphone 322 and onboard computer 104, to input which seats are occupied by which drivers/passenger(s). Embodiments of the present invention are not limited in this regard.

Device interfaces 370 include various interfaces that allow the onboard computer 104 to interact with other devices and/or the environment in the vehicle 102. Device interfaces include a generic device interface 360 which may be any device interface including, but not limited to, a hardware interface, e.g. USB and IEEE 1394 variants, sensors 362, a camera 364 and a Radio Frequency Identification (RFID) reader or near field communication (NFC) transceiver 368, and the like. Embodiments of the present invention are not limited in this regard.

The sensors 362 may include, but are not limited to, seat pressure gauge(s), motion sensors, an accelerometer, an altimeter, a velocity sensor and/or a gyroscope. Accelerometers, motion sensors, altimeters, velocity sensors and gyroscopes are well known in the art, and therefore will not be described herein. However, it should be understood that the sensor data generated by the sensors 362 may be used by the onboard computer 104 to determine which seats are occupied by which passengers.

In one embodiment, a camera 364 facilitates the capturing of images and video automatically or in response to a user-software interaction. At least one of the captured images and videos may be used by the onboard computer to determine the position and/or identity of the passengers in the car. For example, the images and/or videos may be analyzed by facial recognition applications that associate the face of the passenger with the user defined settings 354. In this example, when the onboard computer 104 recognizes a passenger and determines the seat position (e.g., the right rear passenger seat), the onboard computer 104 retrieves the user defined setting for that passenger and instructions any automatically configurable systems in the area of the right rear passenger seat to conform to the user defined setting. Embodiments of the present invention are not limited in this regard.

Methods for automatically determining the identity of persons the driver and passenger(s) by facial recognition are well known in the art, and therefore will not be described in detail herein. Any such method can be used with the present invention without limitation. One such method generally involves: comparing pixel data of an image to stored pixel data of a plurality of pre-captured images; and selecting a location and/or an activity associated with the pre-captured image having the most pixel values that match those of the newly captured image. Embodiments of the present invention are not limited in this regard. For example, the present invention may employ a translation technique in which a captured image is processed to obtain a plurality of translated images. The pixel data of the translated images is then compared with pixel data of a pre-captured and pre-stored image.

The NFC transceiver 368 facilitates the detection of nearby NFC-enabled communication devices 106. NFC may be used by a communication device 106 to inform the onboard computer 104 of the identity of the device owner.

In various implementations of the present invention, the onboard computer 104 may use a combination of location, communication and sensor data to determine the identity of the driver and the seating positions and identities of the passengers. For example, a driver and a passenger may each be carrying a communication device 106 which reports a GPS location coordinate within the vehicle 102 but not with the accuracy needed to resolve who is seated where. In such a case, the onboard computer 104 may use seat pressure gages to determine which seat is occupied by which person by comparing the person's last known weight, if available, with seat pressure gauge readings. Alternatively, input from camera 364 may be used as described above.

Figure 4:
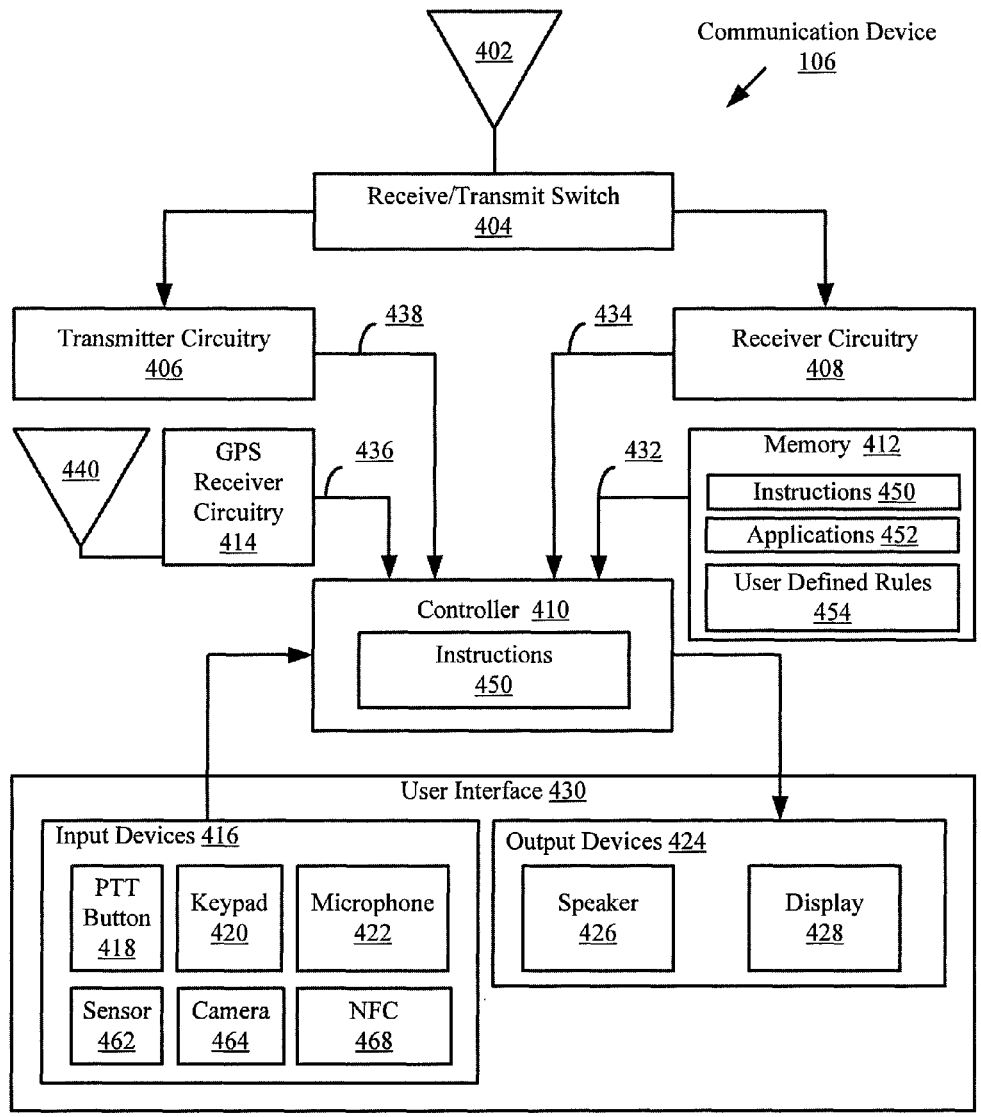
FIG. 4 is a block diagram of an exemplary communication device.

Referring now to FIG. 4, there is provided a more detailed block diagram of the communication device 106. The communication device 106 will be described herein as comprising a mobile phone or a smart phone. However, the present invention is not limited in this regard. For example, the communication device can alternatively comprise a notebook, a laptop computer, a PDA, a tablet computer, a portable navigation device, or other device.

Notably, the communication device 106 can include more or less components than those shown in FIG. 4. For example, the communication device 106 can include a wired system interface, such as a universal serial bus interface (not depicted). However, the components shown are sufficient to disclose an illustrative embodiment implementing the present invention. The hardware architecture of FIG. 4 represents one embodiment of a representative communication device configured to facilitate the provision of automatic vehicle setting control service to a user thereof.

As shown in FIG. 4, the communication device 106 includes an antenna 402 for receiving and transmitting Radio Frequency (RF) signals. A receive/transmit (Rx/Tx) switch 404 selectively couples the antenna 402 to the transmitter circuitry 406 and receiver circuitry 408 in a manner familiar to those skilled in the art. As with the onboard computer 104, the communication device may include receiver circuitry 408 which demodulates and decodes the RF signals received from a network (e.g., the network 104 of FIG. 1) to derive information therefrom. The receiver circuitry 408 is coupled to a controller 410 via an electrical connection 434. The receiver circuitry 408 provides the decoded RF signal information to the controller 410. The controller 410 uses the decoded RF signal information in accordance with the function(s) of the communication device 106. The controller 410 also provides information to the transmitter circuitry 406 for encoding and modulating information into RF signals. Accordingly, the controller 410 is coupled to the transmitter circuitry 406 via an electrical connection 438. The transmitter circuitry 406 communicates the RF signals to the antenna 402 for transmission to an external device (e.g., network equipment of a network not depicted in FIG. 4).

Similarly, the communication device may be GPS-enabled. A GPS-enabled communication device 106 includes, an antenna 440 coupled to GPS receiver circuitry 414 for receiving GPS signals. The GPS receiver circuitry 414 demodulates and decodes the GPS signals to extract GPS location information therefrom. The GPS location information indicates the location of the communication device 106. The GPS receiver circuitry 414 provides the decoded GPS location information to the controller 410. As such, the GPS receiver circuitry 414 is coupled to the controller 410 via an electrical connection 436. Notably, the implementations are not limited to GPS based methods for determining a location of the communication device 106. Other methods for determining a location of a communication device may be used with the various implementations without limitation.

The controller 410 uses the decoded GPS location information in accordance with the function(s) of the communication device 106. For example, the GPS location information and/or other location information can be used to generate a geographic map showing the location of the communication device 106.

The controller 410 stores the decoded RF signal information and the decoded GPS location information in a memory 412 of the communication device 106. Accordingly, the memory 412 is connected to and accessible by the controller 410 through an electrical connection 432. The memory 412 can be a volatile memory and/or a non-volatile memory. For example, the memory 412 can include, but is not limited to, a Random Access Memory (RAM), a Dynamic Random Access Memory (DRAM), a Static Random Access Memory (SRAM), Read-Only Memory (ROM) and flash memory. The memory 412 can also have stored therein the software applications 452 and user-defined rules 454.

The software applications 452 may include, but are not limited to, applications operative to provide telephone services, network communication services, GPS based services, navigation services, location services, position reporting services, traffic status services, tour information services, commerce services, email services, web based services, and/or electronic calendar services. The software applications 452 are also be operative to determine the positions of other devices and/or determine the location of the communication device 106 relative to the other devices.

The user-defined settings 454 may comprise information identifying the owner of the communication device 106 as well as statements that define or constrain some operations of the vehicle 102 and/or the onboard computer 104. More specifically, at least one of the user-defined settings 454 includes one or more setting preferences that define the configuration of various automatically configurable settings through out the vehicle 102. These settings may be retrieved by the onboard computer 104 and utilized in similar ways as described above.

As shown in FIG. 4, one or more sets of instructions 450 are stored in the memory 412. The instructions 450 can also reside, completely or at least partially, within the controller 410 during execution thereof by the communication device 106. In this regard, the memory 412 and the controller 410 can constitute machine-readable media. The term "machine-readable media", as used here, refers to a single medium or multiple media that store the one or more sets of instructions 450. The term "machine-readable media", as used here, also refers to any medium that is capable of storing, encoding or carrying the set of instructions 450 for execution by the communication device 106 and that cause the communication device 106 to perform one or more of the methodologies of the present disclosure.

The controller 410 is also connected to a user interface 430. The user interface 430 is comprised of input devices 416, output devices 424, and software routines (not shown in FIG. 4) configured to allow a user to interact with and control software applications 452 installed on the computing device 106. Such input and output devices respectively include, but are not limited to, a display 428, a speaker 426, a keypad 420, a directional pad (not shown in FIG. 4), a directional knob (not shown in FIG. 4), a microphone 422, a Push-To-Talk ("PTT") button 418, sensors 462, a camera 464 and a Radio Frequency Identification ("RFID") reader or NFC transceiver 468.

The microphone 422 facilitates the capturing of sound and converting the captured sound into electrical signals. The sound can be captured automatically at pre-defined times (e.g., every "N" minutes, were "N" is an integer) or in response to a user-software interaction. Embodiments are not limited in this regard.

The communication device 106 may also include various sensors 462. It should be understood that the sensor data generated by the sensors 462 may be used by the communication device 106, and or by a server to determine an updated position estimate. Methods for generating an updated position estimates based on location data and various sensor data (e.g., acceleration data, motion sensor data, altitude data and velocity data) are well known in the art. Any such method can be used and embodiments are not limited in this regard.

The camera 464 facilitates the capturing of images and video automatically or in response to a user-software interaction. Embodiments are not limited in this regard.

The NFC transceiver 468 facilitates NFC communication with other nearby devices such as the onboard computer 104.

As noted above, the system 100 implements methods for controlling passenger and driver preferences for automatically adjustable settings by an on-board computer in a vehicle based on a location and/or identity of a person in a vehicle. Exemplary embodiments of such methods will now be described in relation to FIGS. 5-6.

Exemplary Methods

Figure 5:
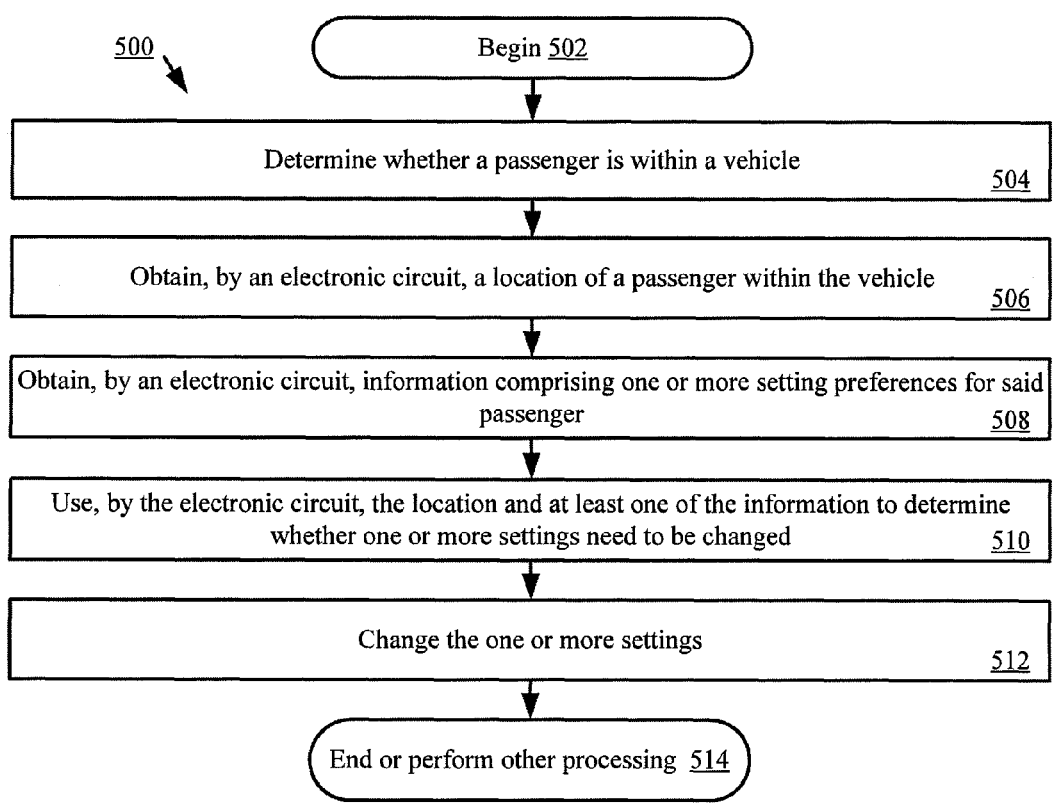
FIG. 5 is a flow diagram of an exemplary method for controlling passenger and/or driver preferences in a vehicle.

Referring now to FIG. 5, there is provided a flow diagram of an exemplary method 500 for automatically controlling passenger and driver preferences for automatically adjustable settings by an on-board computer in a vehicle based on a location and/or identity of a person in a vehicle. The method 500 will be described in an automotive computing context. The method 500 is useful in other applications, such as mobile phone and smart phone applications, portable computer applications, PDA applications, portable navigation device applications, and any other application in which passenger and driver preferences need to be automatically controlled based on based on a location and/or identity of a person in a vehicle. The method 500 will also be described in a GPS based context. The method 500 is also not limited in this regard. The method 500 is useful in other location based applications, such as reference coordinate system based location applications, radiological topographical survey based location applications, local microwave/sonar beacon/receiver based location applications, ultrasound ranging based location applications, laser ranging based location applications, inertial navigation systems, and/or triangulation based location applications. Further, the method 500 will be described in reference to an electronic circuit, which may be present in any device capable of running any of the above mentioned applications.

As shown in FIG. 5, the method 500 begins with step 502 and continues with step 504. In step 504, a determination is made, by an electronic circuit, concerning whether a passenger is within the vehicle 102. This determination may be made by comparing a location of the vehicle 102 with a location of the passenger—e.g. the GPS locations of the vehicle 102, onboard computer 104, and communication device 106— until the distance between the two locations is reduced to some predetermined distance. In this exemplary embodiment, the onboard computer 104 computes a location estimate using the GPS signals. The location estimate specifies an estimated geographic location of the vehicle 102 relative to Earth's surface. The estimated position may be a multidimensional estimated location, such as a two dimensional or three dimensional estimated location. Methods for computing position estimates using GPS signals are well known in the art, and therefore will not be described here. Any such method may be used in step 504 without limitation. If the vehicle is in motion and the communication device 106 is also in the same motion with respect to direction and speed, the electronic circuit may determine the passenger who owns the communication device 106 to be within the vehicle 102. Alternative methods may be employed to determine the identity of the passenger and the collocation of the passenger with the vehicle 102. For example, as previously noted herein, a fingerprint of the passenger may be scanned, a bar-code may be used, and RFID keyfob can be scanned, or a password may be entered on a keypad, or other means employed to identify the passenger, without limitation.

Upon completing step 504, step 506 is performed where the electronic circuit obtains a position of a passenger within the vehicle. The position of the passenger, e.g. one of the positions 210-216 shown in FIG. 2, may be obtained through methods including, but not limited to, image analysis, weight sensor data, and direct entry by a user. Image analysis may be conducted on images or videos captured by camera 342 using methods including, but not limited to, facial and pattern recognition. Methods for automated image analysis are well known in the art, and therefore will not be described here. Any such method may be used in step 506 without limitation. Additionally, weight sensing systems and methods are also well known in the art, for example, in safety systems which determine the presences and approximate size of a passenger for the deployment of air bags. Further, user-software interactions for direct entry of passenger position information are well known in the art, and therefore will not be described herein. Any such user-software interaction can be used in step 506 without limitation. Also, in to alternative, steps 504 and 506 may be implemented using image analysis without the use of GPS data—i.e., image analysis may be used to determine the identity and position of a passenger in the vehicle 102 directly.

Upon completing step 506, step 508 is performed where the electronic circuit obtains information comprising one or more setting preferences, e.g. the user defined settings 354 stored in memory 312 as shown in FIG. 3. Other methods of obtaining the information may include, but are not limited to, direct user entry into onboard computer 104 and automatic entry and storage of the user defined settings 354 in combination with any of the methods of determining position as described in step 506. Alternatively, the user defined settings 452 may be stored in memory 412 in passenger communication device 106, as shown in FIG. 4. The embodiments are not limited in this regard.

In an implementation, onboard computer 104 may obtain the position of a passenger A, e.g. the front passenger seat, as described in step 506 and then store, in memory 312, the setting preferences for the front passenger seat that passenger A uses while within the vehicle as the user defined settings 354 for passenger A. Continuing this example, the next time passenger A is determined to be within the vehicle 102, the onboard computer 104 obtains the position of passenger A, e.g. the left rear passenger seat, as described in step 506. The onboard computer 104 will recognize passenger A and will retrieve the previously stored user defined settings for passenger A and apply them to the left rear passenger seat position to the extent they are applicable. One skilled in the art will note that the range of setting preferences that are applicable to the front seats may be different from those that are applicable to the rear seats. Although some settings may be the same, the on-board computer 104 may also store separate settings for each seat position for the same person, in this example passenger A. Thus, if in the above example, passenger A changes a setting during the second trip, this would apply only to rear passenger seat setting preferences and may not overwrite the settings previously stored for passenger A for the front passenger seat.

Referring again to FIG. 5, the method 500 continues with step 510 where the electronic circuit determines whether any of the automatically configurable settings need to be changed for the seat positions where a passenger is seated. Continuing the example described above, passenger A sits in a seat position in the vehicle 102, e.g. front passenger seat 212 from FIG. 2. The electronic circuit uses the position of passenger A, obtained in step 506, and the user defined setting information, obtained in step 508, for passenger A for the front passenger seat 212 and compares the user defined setting information with the current settings for the front passenger seat. If the current settings do not match the user defined setting information obtained in step 508, the current settings need to be changed to conform to the stored user defined settings 354.

Upon completing step 510, step 512 is performed where the electronic circuit changes one or more of the automatically configurable settings of one or more of the seat positions, e.g. the front passenger seat position. For example, when passenger A sits in the front passenger seat 212, the automatically configurable settings that apply to that seat position may be set for passenger B. After determining that the current settings need to be changed in step 510, the electronic circuit instructs the circuitry controlling the configuration of the front passenger seat to conform to the stored user defined settings 354 for passenger A. Upon completing step 512, step 514 is performed where the method 500 ends or other processing is performed.

A further implementation provides for a passenger to change one or more settings, and for the changes to be saved as updated setting preferences. For example, the new settings may be communicated to and stored by the communication device 106 or by the on-board computer 104.

Figure 6:
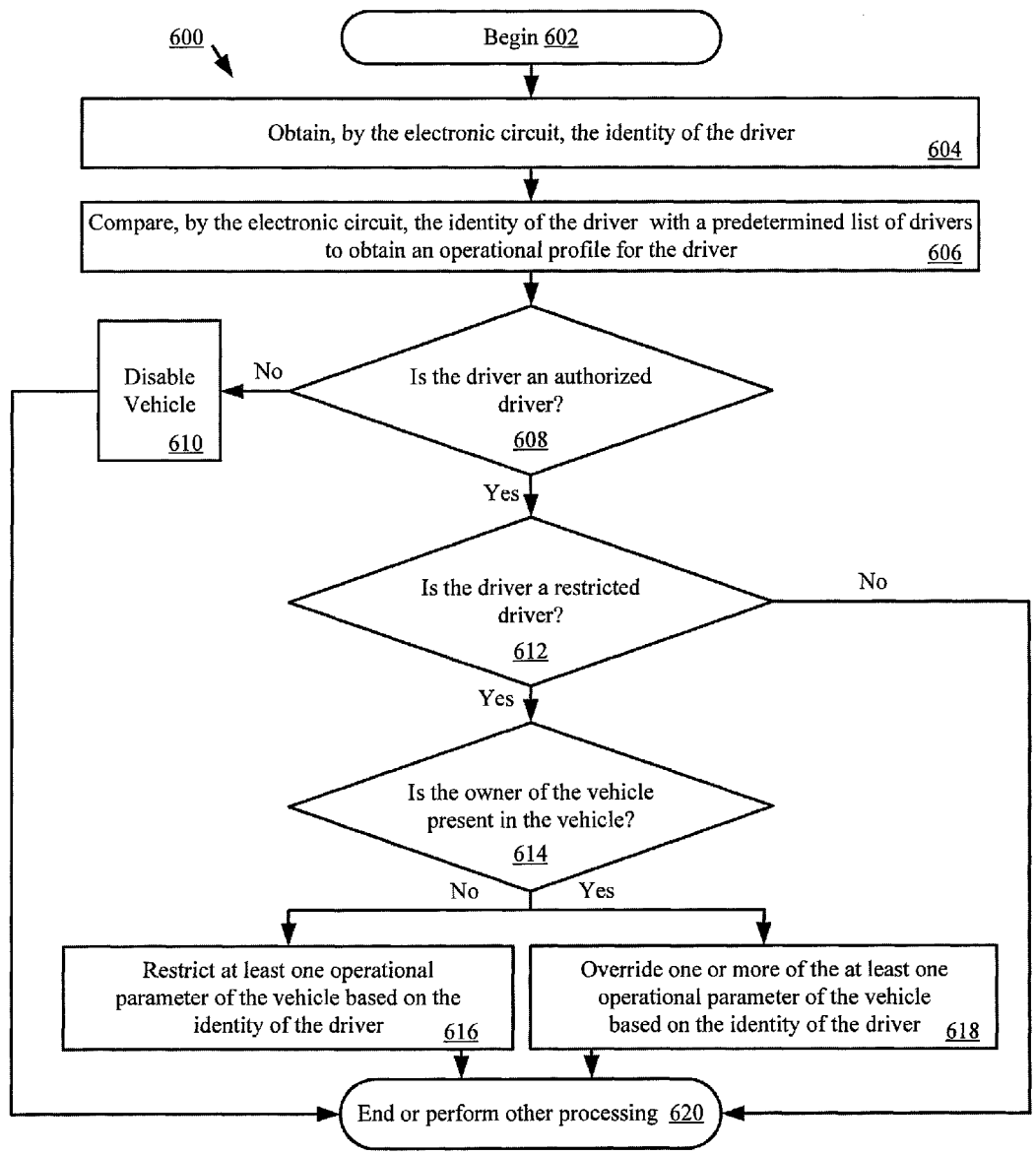
FIG. 6 is a flow diagram of an exemplary method for controlling driver functions in a vehicle.

Referring now to FIG. 6, there is provided a flow diagram of a second exemplary method 600 for automatically controlling driver preferences for automatically adjustable settings by an onboard computer in a vehicle based on a location and/or identity of a person in a vehicle. The method 600 will be described in an automotive computing context using GPS for location determination, but method 600 is also not limited in either regard.

As shown in FIG. 6, the method 600 begins with step 602 and continues with step 604. In step 604, an electronic circuit obtains the identity of the driver of the vehicle 102. The identity of the driver may be obtained using any method of identifying an individual including, but not limited to, direct entry by the driver into the onboard computer 104 or communication device 106, image analysis and/or facial recognition analysis of an image of the driver—e.g. an image captured by camera 342 from FIG. 3—and weight sensors present in the driver's seat.

Upon completing step 604, step 606 is performed where the electronic circuit obtains information comprising one or more driver setting preferences for the driver of vehicle 102. Driver setting preferences are those setting preferences which apply to the driver of the vehicle. Driver setting preferences include, but are not limited to, rear view mirror position, engine tuning presents (e.g. fuel efficient or high power), dash radio/satellite presets, environmental controls, and GPS/navigation settings. For step 606, the identity of the driver, along with any settings associated with that driver may be stored as user defined settings 352, as described above in reference to FIG. 5. For example, passenger A may also be a driver of vehicle 102. Thus, when passenger A sits in the driver seat of vehicle 102, the onboard computer may obtain the position of passenger A and retrieve the user defined settings 352 for passenger A in the same way as described in steps 606 and 608.

Upon completing step 606, the electronic circuit performs a series of processing steps 608-614 that use the identity of the driver obtained in step 604 to determine if one or more operational restrictions are to be enabled for the driver. As described above, the user defined settings 352 may include operational restrictions as well as setting preferences. Operational restrictions restrict or limit some operational parameter of the vehicle including, but not limited to, limiting speed, driving hours, driving area, and the number of occupants. Additionally, the operational restrictions may disable the vehicle all together, such as when a driver has been designated as an unauthorized or forbidden driver or when at least one passenger in the car fails to engage a seat belt.

The owner of the vehicle may register a number of individuals to be authorized drivers of the car. This may be accomplished through any method of inputting data into the onboard computer 104 including but not limited to, direct entry into onboard computer 104 or communication device 106, image analysis of an image to identify the individuals (e.g. through facial recognition), and weight sensors present in the driver's seat. There may be multiple categories of drivers including but not limited to, owners, authorized drivers, unrestricted drivers, restricted drivers, and unauthorized drivers. For example, an individual who purchases the vehicle may be registered as the owner of the vehicle and given permanent rights as an unrestricted driver. The owner may register a spouse as an owner and/or as an unrestricted driver. Other adults, such as adult children, siblings, and parents may be registered as unrestricted drivers. Driving age minor children may be registered as a restricted driver and the owner may set one or more operational restrictions to one or more operational parameters to prevent the driving age minor child from operating the vehicle under undesirable circumstances including, but not limited to, preventing speeding, disabling the vehicle during certain hours (i.e. blackout hours), preventing operation within certain geographic areas (i.e. blacklist areas), disabling the vehicle that has too many occupants, and disabling the vehicle if one or more occupant fails to secure a seat belt. These operational restrictions may be set in any combination.

In an implementation, the owner may configure operational profiles for each authorized driver of the vehicle 102. For example, an owner wishes to allow a teenage child to operate vehicle 102, but does not wish the teenage child to exceed the speed limit while driving, to take the vehicle into a major city, or to operate the vehicle with more than two total occupants. The owner may register the teenage child as an authorized, restricted driver and set operational parameters that limit the speed of the vehicle to the posted speed limit. A further operation parameter would prevent the vehicle from entering a particular, predefined area (e.g. within 10 miles of "downtown"). Alternatively, the owner may set an operational parameter that prevents the vehicle from being operated outside of a particular, predefined area (e.g. beyond 10 miles from "home"). A further operational parameter may disable the vehicle altogether if more than 2 occupants are inside the vehicle. All other operational parameters may be unrestricted. For example, the teenage driver may drive the vehicle at any time of day because there were no blackout hours set to restrict operation of the vehicle. Additionally, if the owner is determined to be in the vehicle, the restrictions may be automatically overridden. Operational parameters may include, but are not limited to, vehicle speed, vehicle occupancy, allowed driving hours, allowed driving area, and seatbelt use. These operational parameters may be restricted in any combination. Embodiments are not limited in this regard.

Referring again to FIG. 6, the electronic circuit determines whether the individual in the driver's seat is an authorized driver. The electronic circuit retrieves the user defined settings 352 and determines if the individual identified as the driver is registered as an authorized driver. If the individual is not an authorized driver [608:NO], then the method 600 continues to step 610, where the onboard computer disables the vehicle entirely. This disabling may occur by any method that prevents the vehicle from being driven. Methods of disabling a vehicle so that it may not be driven are well known in the art and therefore will not be discussed in further detail herein. The method 600 then continues to step 620 where the method 600, ends or other processing is performed.

If the individual is an authorized driver [608:YES], then the method continues to step 612. Step 612 involves a determination of whether the individual is a restricted driver. The electronic circuit determines whether the individual is a restricted driver in the same way as the determination made in step 608 whether the individual is an authorized driver. If the individual is an unrestricted driver [612:NO], then the method 600 continues to step 620 where the method 600 ends or other processing is performed.

If the individual is a restricted driver [612:YES], then the method continues to step 614, where the electronic circuit determines if the owner is present in the vehicle. This determination may occur in the same way as it does for the driver in step 604. As noted above, the owner may wish to override one or more of the operational restrictions imposed on the vehicle when driven by a restricted driver if the owner is in the vehicle. The owner may set a preference, for example, to only override one or more of the operational restrictions if the owner is in the front passenger seat 212. Alternatively, the owner may set a preference to override one or more of the operational restrictions if the owner is present anywhere in the vehicle. If the owner is not determined to be in the vehicle [614:NO], then the method 600 continues to step 616 where the electronic circuit restricts at least one operational parameter of the vehicle based on the identify of the driver as a restricted driver. The method 600 continues to step 620 where the method 600 ends or other processing is performed.

If the owner is determined to be in the vehicle, e.g. in the front passenger seat, [614:YES], then the method 600 continues to step 618 where the electronic circuit overrides one or more of the operational restrictions that would otherwise be imposed on the restricted driver. One of skill in the art will recognize that some or all of the restrictions may be overridden. For example, the owner may wish to not impose the limitation on driving area or total number of occupants, but may wish to continue to impose the limitation on driving speed. As with the operational restrictions themselves, the owner may override the restrictions in any combination. The method 600 then continues to step 620 where method 600 ends or other processing is performed.

In various implementations, the methods described above may be implemented in systems and devices which include non-transient computer-readable media. Such systems may include at least one electronic circuit configured to perform the methods described above. Devices which include non-transient computer readable media may also include computer programs having a number of code sections. These code sections may be executable by a computer to cause the computer to perform the methods described above.

All of the apparatus, methods and algorithms disclosed and claimed herein can be made and executed without undue experimentation in light of the present disclosure. While example embodiments have been shown, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for controlling one or more settings of a vehicle using a device comprising an electronic circuit, the method comprising:
    initially determining, by the electronic circuit, whether a passenger is within the vehicle by:
        determining a first and a second geographic location of a passenger communication device associated with the passenger;
        determining a first and a second geographic location of the vehicle; and
        comparing the first and second geographic locations of the passenger communication device with the first and second geographic locations of the vehicle to determine if the passenger is traveling in the vehicle;
    obtaining, by the electronic circuit, a position of the passenger within the vehicle;
    identifying, by the electronic circuit, the passenger via at least one of the following: image analysis, facial recognition, scanning a bar-code, or input of a password;
    obtaining, by the electronic circuit, information comprising one or more setting preferences for the passenger;
    using, by the electronic circuit, the position and the information to determine whether one or more settings need to be changed; and
    changing the one or more settings based on the position and identity of the passenger;
    identifying, by the electronic circuit, a driver of the vehicle;
    comparing, by the electronic circuit, the identity of the driver with a predetermined list of drivers of the vehicle to obtain an operational profile for the driver;
    using, by the electronic circuit, the operational profile to determine whether one or more operational parameters of the vehicle need to be restricted; and
    changing a plurality of operational parameters based on the operational profile, wherein the operational parameters include at least one of vehicle speed, vehicle occupancy, allowed driving hours, allowed driving area, and seatbelt use.

2. The method according to claim 1, wherein the identifying also occurs via weight sensor analysis.

3. The method according to claim 1, wherein the identifying also occurs via at least one of scanning a fingerprint, and scanning an RFID keyfob.

4. The method according to claim 1, wherein the settings include at least one of seat position settings, mirror position settings, audio system settings, video system settings, medial libraries; environmental control system settings, heating and cooling system settings, vent direction settings, navigation system settings, and engine settings.

5. The method according to claim 1, further comprising:
storing information comprising one or more setting preferences for the passenger.

6. The method according to claim 5, wherein the information comprising one or more setting preferences is stored on the passenger communication device associated with the passenger; and
wherein the obtaining information comprising one or more setting preferences for the passenger occurs via a wireless connection between said electronic circuit and the passenger communication device.

7. The method according to claim 5, wherein the information comprising one or more setting preferences is stored on an onboard computer in the vehicle.

8. The method according to claim 1, wherein the predetermined list of drivers of the vehicle defines the driver as at least one of owner, authorized driver, unauthorized driver, restricted driver, and unrestricted driver.

9. The method according to claim 8, further comprising:
on a condition that the driver is a restricted driver, imposing a restriction of at least one operational parameter of the vehicle based on the operational profile for the restricted driver;
on a condition that the owner is in a passenger seat in the vehicle, overriding the restriction of at least one operational parameter of the vehicle associated with the restricted driver; and
on a condition that the driver is an unauthorized driver, disabling the vehicle.

10. A method for controlling one or more settings of a vehicle using a device comprising an electronic circuit, the method comprising:
identifying, by an electronic circuit, a passenger within the vehicle via at least one of the following: image analysis, facial recognition, scanning a bar-code, or input of a password;
obtaining, by the electronic circuit, a position of the passenger within the vehicle;
obtaining, by the electronic circuit, information comprising one or more setting preferences for the passenger;
using, by the electronic circuit, the position and at least one of the setting preferences to determine whether one or more settings need to be changed;
changing the one or more settings based on the position and identity of the passenger;
identifying, by the electronic circuit, a driver of the vehicle;
comparing, by the electronic circuit, the identity of the driver with a predetermined list of drivers of the vehicle to obtain an operational profile for the driver;
using, by the electronic circuit, the operational profile to determine whether one or more operational parameters of the vehicle need to be restricted; and
changing a plurality of operational parameters based on the operational profile, wherein the operational parameters include at least one of vehicle occupancy, allowed driving hours, allowed driving area, and seatbelt use.

11. A method for controlling one or more settings of a vehicle using a device comprising an electronic circuit, the method comprising:
identifying, by an electronic circuit, a driver passenger within the vehicle via at least one of the following: image analysis, facial recognition, scanning a bar-code, or input of a password;
obtaining, by the electronic circuit, information comprising one or more setting preferences for the driver;
using, by the electronic circuit, the position and at least one of the setting preferences to determine whether one or more settings need to be changed;
changing the one or more settings based on the position and identity of the driver;
comparing, by the electronic circuit, the identity of the driver with a predetermined list of drivers of the vehicle to obtain an operational profile for the driver wherein the predetermined list of drivers of the vehicle defines the driver as at least one of owner, authorized driver, unauthorized driver, restricted driver, and unrestricted driver;
using, by the electronic circuit, the operational profile to determine whether one or more operational parameters of the vehicle need to be restricted; and
changing a plurality of operational parameters based on the operational profile, wherein the operational parameters include at least one of vehicle occupancy, allowed driving hours, allowed driving area, and seatbelt use.

* * * * *